United States Patent Office 3,202,695
Patented Aug. 24, 1965

3,202,695
ADDUCT OF CYCLO - BUTANE - 1,2 - DICYANIDE WITH SULFURIC ACID MONOHYDRATE AND METHOD OF MAKING SAME
Janice L. Greene, Warrensville Heights, and James D. Idol, Jr., Shaker Heights, Ohio, assignors to The Standard Oil Company, Cleveland, Ohio, a corporation of Ohio
No Drawing. Filed Aug. 3, 1962, Ser. No. 214,532
2 Claims. (Cl. 260—464)

This invention relates to the cyclo-butane-1,2-dicyanide adduct with sulfuric acid monohydrate. The invention is also concerned with the method of making the adduct by reacting cyclo-butane-1,2-dicyanide with the monohydrate of sulfuric acid.

Either the cis or trans forms of the cyclo-butane-1,2-dicyanide can be used as a starting material to form cis or trans dicarboxamide adducts. The invention is also applicable to a mixture. The trans-cyclo-butane-1,2-dicyanide is the more readily available starting material and this form will be described in the preferred embodiment hereinafter.

The starting materials and relative amounts are indicated by the following formulas:

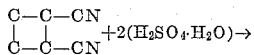

The exact molecular configuration of the product has not been established but it has the following general formula:

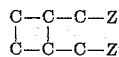

where Z has the empirical formula:

The structure is postulated to be

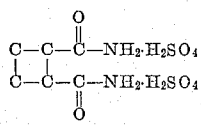

or

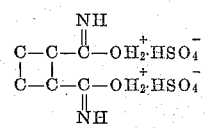

or

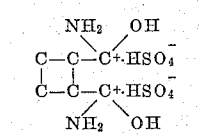

or other tautomeric forms.

In carrying out the process, the sulphuric acid monohydrate and the cyclo-butane-1,2-dicyanide are mixed together or one added to the other at a temperature of from 40 to 125° C. for from 15 minutes to four hours, followed by cooling or permitting the reaction product to come to ambient temperature. The higher the reaction temperature, the shorter the reaction time, and the lower the temperature, the longer the reaction time. The reaction is exothermic and external cooling can be used if desired. Temperatures of from 50 to 95° C. are preferred because higher temperatures may somewhat affect the stability of the cyclo-butane ring. The preferred reaction time in this temperature range is 1 to 2 hours.

The relative amounts of the reaction components are preferably theoretical, but an excess of either can be used in the process, but will remain in the final product unless steps are taken to separate it.

The adduct made in accordance with the present invention is useful as a chemical intermediate, such as in the formation of cyclo-butane-1,2-dicarboxamide, the preparation of which is described in our copending application Serial No. 214,531, now Patent No. 3,110,729 filed of even date herewith, the disclosure of which is incorporated by reference.

The following is the best mode contemplated for carrying out the invention:

Example I 1 mol of trans-cyclo-butane-1,2-dicyanide was gradually added to 2 mols of sulphuric acid monohydrate at a rate so that the temperature was maintained between 75° and 95° C. with external cooling supplied as needed. It was maintained at a temperature of 70° C. for 1½ hours with constant stirring. It was then cooled to ambient temperature. The adduct was a clear, white, viscous liquid, and extremely hygroscopic.

It has the following analysis:

|          | Theoretical, percent | Actual, percent |
|----------|----------------------|-----------------|
| Carbon   | 21.3                 | 20.99           |
| Hydrogen | 4.15                 | 4.07            |
| Nitrogen | 8.30                 | 7.96            |
| Sulfur   | 18.95                | 18.75           |

In addition to the above analysis, the nuclear magnetic resonance spectrum confirms the presence of the cyclo-butane ring and the infrared spectrum confirms the absence of any nitrile groups. Products made from the adduct have the 1,2-configuration confirming the 1,2-positions of Z in the adduct.

We claim:

1. The method of preparing an adduct, which comprises the step of reacting 1 mole of cyclo-butane-1,2-dicyanide with 2 moles of the monohydrate of sulphuric acid, said reaction being continued for from 15 minutes to four hours at a temperature of 40 to 125° C., followed by cooling to ambient temperature, and recovering the adduct.

2. The method of preparing an adduct, which comprises the step of adding cyclo-butane-1,2-dicyanide to the monohydrate of sulfuric acid in the ratio of 1 mol of the dicyanide to 2 mols of the monohydrate, while maintaining a temperature of 50 to 95° C., followed by cooling to ambient temperature, and recovering the adduct.

No references cited.

CHARLES B. PARKER, *Primary Examiner.*